US010287205B2

(12) United States Patent
Sun

(10) Patent No.: US 10,287,205 B2
(45) Date of Patent: May 14, 2019

(54) OPTICAL GLASS

(71) Applicant: CDGM GLASS CO., LTD, Chengdu, Sichuan (CN)

(72) Inventor: Wei Sun, Chengdu (CN)

(73) Assignee: CDGM GLASS CO., LTD., Sichuan (CN)

( * ) Notice: Subject to any disclaimer, the term of this patent is extended or adjusted under 35 U.S.C. 154(b) by 0 days.

(21) Appl. No.: 15/546,244

(22) PCT Filed: Apr. 6, 2016

(86) PCT No.: PCT/CN2016/078511

§ 371 (c)(1),
(2) Date: Jul. 25, 2017

(87) PCT Pub. No.: WO2016/161927

PCT Pub. Date: Oct. 13, 2016

(65) Prior Publication Data

US 2018/0016182 A1 Jan. 18, 2018

(30) Foreign Application Priority Data

Apr. 10, 2015 (CN) .......................... 2015 1 0167574

(51) Int. Cl.

| | |
|---|---|
| ***C03C 3/068*** | (2006.01) |
| ***G02B 1/118*** | (2015.01) |
| ***G02B 3/00*** | (2006.01) |
| ***G02B 1/00*** | (2006.01) |
| *G02B 27/00* | (2006.01) |

(52) U.S. Cl.

CPC ................ *C03C 3/068* (2013.01); *G02B 1/00* (2013.01); *G02B 1/118* (2013.01); *G02B 3/0087* (2013.01); *C03C 2201/3411* (2013.01); *C03C 2201/3417* (2013.01); *C03C 2201/3452* (2013.01); *C03C 2201/3488* (2013.01); *G02B 27/0062* (2013.01)

(58) Field of Classification Search

CPC ................................ C03C 3/066; C03C 3/068

See application file for complete search history.

(56) References Cited

U.S. PATENT DOCUMENTS

2009/0325779 A1* 12/2009 Negishi .................. C03C 3/068 501/78

FOREIGN PATENT DOCUMENTS

| | | |
|---|---|---|
| CN | 102372430 A | 3/2012 |
| DE | 3130066 A1 | 2/1983 |

OTHER PUBLICATIONS

"Colourless optical glass test methods Density." pp. 65-69, 1987.

Jun. 24, 2016 Search Report issued in International Patent Application No. PCT/CN2016/078511.

* cited by examiner

*Primary Examiner* — Elizabeth A. Bolden
(74) *Attorney, Agent, or Firm* — Oliff PLC

(57) ABSTRACT

An optical glass with high refractive index and low dispersion, having refractive index nd of 1.78-1.95, Abbe number νd of 32-50, and contains no $GeO_2$, so it is not easily devitrified. An optical glass, represented by cation %, including: 1-20% of $Si^{4+}$; 25-60% of $B^{3+}$; 10-40% of $La^{3+}$; 0-15% of $Y^{3+}$; 0-20% of $Nb^{5+}$; 0-15% of $Ti^{4+}$; 0-10% of $Ta^{5+}$; 0-5% of $W^{6+}$; 0-15% of $Zr^{4+}$; 0-10% of $Zn^{2+}$; 0-10% of $Bi^{3+}$. An optical glass with excellent transmittance, an optical glass preform and an optical element formed by the above optical glass. The optical element made by the above optical glass and the above glass preform or optical element blank, such as lens, can be used for optical systems.

16 Claims, No Drawings

OPTICAL GLASS

TECHNICAL FIELD

The invention relates to an optical glass with high refractive index and low dispersion, and press-molding glass preform and an optical element formed by the above glass.

BACKGROUND

The optical glass with high refractive index and low dispersion can correct chromatic aberration to miniaturize the optical system, thus it is developed rapidly in recent years. Particularly the market demands on the optical glass with high refractive index and low dispersion, having refractive index nd of 1.78-1.95 and Abbe number vd of 32-50, are increasing.

The formulation system often used for such optical glass is lanthanum borate glass system, but the content of $B_2O_3$ and $SiO_2$ as network formers is higher, the refractive index nd of the optical glass may be reduced; but if more ingredients with high refractive index are given to glass in the formulation system, it is very easy to cause the glass stability to be reduced and the glass devitrified in the manufacturing process. Meanwhile, low-cost glass is the direction of improving glass in recent years, and the cost of the raw material $GeO_2$ usually introduced in the previous manufacturing is higher.

SUMMARY

The technical problem to be resolved in the present invention is to provide an optical glass with high refractive index and low dispersion, having refractive index nd of 1.78-1.95, Abbe number vd of 32-50, and the glass contains no $GeO_2$, so it is not easily devitrified.

The present invention also provides a glass preform and an optical element formed by the above optical glass.

To solve the technical problem, the technical scheme of the present invention provides: an optical glass, represented by cation %, comprising:

1-20% of $Si^{4+}$;

25-60% of $B^{3+}$;

moreover, the total amount of $Si^{4+}$ and $B^{3+}$ being 30-70%;

10-40% of $La^{3+}$;

0-15% of $Y^{3+}$;

the total amount of $La^{3+}$, $Y^{3+}$, $Gd^{3+}$ and $Yb^{3+}$ is 20-55%;

$(Si^{4+}+B^{3+})/(La^{3+}+Y^{3+}+Gd^{3+}+Yb^{3+})$ is greater than 1 but less than 2.5;

0-20% of $Nb^{5+}$;

0-15% of $Ti^{4+}$;

0-10% of $Ta^{5+}$;

0-5% of $W^{6+}$;

the total amount of $Nb^{5+}$, $Ti^{4+}$, $Ta^{5+}$ and $W^{6+}$ being 0-20%;

$(Nb^{5+}+Ti^{4+})/(Nb^{5+}+Ti^{4+}+Ta^{5+}+W^{6+})$ being 0.7-1;

$(Nb^{5+}+Ti^{4+}+Ta^{5+}+W^{6+})/(Si^{4+}+B^{3+})$ being 0.01-0.5;

$(Nb^{5+}+Ti^{4+}+Ta^{5+}+W^{6+})/(La^{3+}+Y^{3+}+Gd^{3+}+Yb^{3+})$ being 0.02-0.6;

0-15% of $Zr^{4+}$;

0-10% of $Zn^{2+}$;

0-10% of $Bi^{3+}$.

Furthermore, it also comprises:

the total amount of $Li^{+}$, $Na^{+}$ and $K^{+}$ being less than 10%;

and/or the total amount of $Ba^{2+}$, $Mg^{2+}$, $Ca^{2+}$ and $Sr^{2+}$ being less than 10%.

Furthermore, it also comprises, the total amount of $Li^{+}$, $Na^{+}$ and $K^{+}$ being less than 5%;

and/or the total amount of $Ba^{2+}$, $Mg^{2+}$, $Ca^{2+}$ and $Sr^{2+}$ being less than 5%.

Furthermore, it comprises 2-15% of $Si^{4+}$; and/or 25-45% of $B^{3+}$ (exclusive of 45%); and/or 15-35% of $La^{3+}$; and/or 0-13% of $Y^{3+}$; and/or 0-10% of $Gd^{3+}$; and/or 0-10% of $Yb^{3+}$; and/or 0-15% of $Nb^{5+}$; and/or 1-8% of $Ti^{4+}$; and/or 0-7% of $Ta^{5+}$; and/or 0-10% of $Zr^{4+}$; and/or 0-5% of $Zn^{2+}$; and/or 0-6% of $Bi^{3+}$; and/or the total amount of $Si^{4+}$ and $B^{3+}$ is 30-60%; and/or the total amount of $La^{3+}$, $Y^{3+}$, $Gd^{3+}$ and $Yb^{3+}$ is 25-50%; and/or $(Si^{4+}+B^{3+})/(La^{3+}+Y^{3+}+Gd^{3+}+Yb^{3+})$ is greater than 1 but less than 2.2; and/or the total amount of $Nb^{5+}$, $Ti^{4+}$, $Ta^{5+}$ and $W^{6+}$ is 0-15%; and/or $(Nb^{5+}+Ti^{4+})/(Nb^{5+}+Ti^{4+}+Ta^{5+}+W^{6+})$ is 0.8-1; and/or $(Nb^{5+}+Ti^{4+}+Ta^{5+}+W^{6+})/(Si^{4+}+B^{3+})$ is 0.02-0.4; and/or $(Nb^{5+}+Ti^{4+}+Ta^{5+}+W^{6+})/(La^{3+}+Y^{3+}+Gd^{3+}+Yb^{3+})$ is 0.03-0.5.

Furthermore, it comprises 5-13% of $Si^{4+}$; and/or 30-45% of $B^{3+}$ (exclusive of 45%); and/or 20-35% of $La^{3+}$; and/or 0-10% of $Y^{3+}$; and/or 1-8% of $Gd^{3+}$; and/or 0-5% of $Yb^{3+}$; and/or 0.5-10% of $Nb^{5+}$; and/or 3-8% of $Ti^{4+}$; and/or 0-1.1% of $Zn^{2+}$ (exclusive of 1.1%); and/or the total amount of $Si^{4+}$ and $B^{3+}$ is 40-55%; and/or the total amount of $La^{3+}$, $Y^{3+}$, $Gd^{3+}$ and $Yb^{3+}$ is 30-50%; and/or $(Si^{4+}+B^{3+})/(La^{3+}+Y^{3+}+Gd^{3+}+Yb^{3+})$ is greater than 1 but less than 2; and/or the total amount of $Nb^{5+}$, $Ti^{4+}$, $Ta^{5+}$ and $W^{6+}$ is 3-15%; and/or $(Nb^{5+}+Ti^{4+})/(Nb^{5+}+Ti^{4+}+Ta^{5+}+W^{6+})$ is 0.9-1; and/or $(Nb^{5+}+Ti^{4+}+Ta^{5+}+W^{6+})/(Si^{4+}+B^{3+})$ is 0.03-0.35; and/or $(Nb^{5+}+Ti^{4+}+Ta^{5+}+W^{6+})/(La^{3+}+Y^{3+}+Gd^{3+}+Yb^{3+})$ is 0.04-0.4.

Furthermore, it comprises 2.5-8% of $Gd^{3+}$; and/or 3-7% of $Ti^{4+}$.

Furthermore, the refractive index nd of the optical glass is 1.85-1.95, and the Abbe number vd is 32-40; when transmittance reaches 70%, the corresponding wave length is below 420 nm.

Furthermore, it comprises 2-15% of $Si^{4+}$; and/or 45-60% of $B^{3+}$; and/or 15-35% of $La^{3+}$; and/or 0-13% of $Y^{3+}$; and/or 0-10% of $Gd^{3+}$; and/or 0-10% of $Yb^{3+}$; and/or 0-15% of $Nb^{5+}$; and/or 0-8% of $Ti^{4+}$; and/or 0-7% of $Ta^{5+}$; and/or 0-10% of $Zr^{4+}$; and/or 0-5% of $Zn^{2+}$; and/or 0-6% of $Bi^{3+}$; and/or the total amount of $Si^{4+}$ and $B^{3+}$ is 40-65%; and/or the total amount of $La^{3+}$, $Y^{3+}$, $Gd^{3+}$ and $Yb^{3+}$ is 25-50%; and/or $(Si^{4+}+B^{3+})/(La^{3+}+Y^{3+}+Gd^{3+}+Yb^{3+})$ is greater than or equal to 1.5 but less than 2.5; and/or the total amount of $Nb^{5+}$, $Ti^{4+}$, $Ta^{5+}$ and $W^{6+}$ is 0-15%; and/or $(Nb^{5+}+Ti^{4+})/(Nb^{5+}+Ti^{4+}+Ta^{5+}+W^{6+})$ is 0.8-1; and/or $(Nb^{5+}+Ti^{4+}+Ta^{5+}+W^{6+})/(Si^{4+}+B^{3+})$ is 0.02-0.4; and/or $(Nb^{5+}+Ti^{4+}+Ta^{5+}+W^{6+})/(La^{3+}+Y^{3+}+Gd^{3+}+Yb^{3+})$ is 0.03-0.5.

Furthermore, it comprises 5-13% of $Si^{4+}$; and/or 45-55% of $B^{3+}$; and/or 20-35% of $La^{3+}$; and/or 0-10% of $Y^{3+}$; and/or 0-8% of $Gd^{3+}$; and/or 0-5% of $Yb^{3+}$; and/or 0.5-10% of $Nb^{5+}$; and/or 0-5% of $Ti^{4+}$; and/or 0.5-5% of $Zn^{2+}$; and/or the total amount of $Si^{4+}$ and $B^{3+}$ is 50-65%; and/or the total amount of $La^{3+}$, $Y^{3+}$, $Gd^{3+}$ and $Yb^{3+}$ is 25-45%; and/or $(Si^{4+}+B^{3+})/(La^{3+}+Y^{3+}+Gd^{3+}+Yb^{3+})$ is 1.7-2.3; and/or the total amount of $Nb^{5+}$, $Ti^{4+}$, $Ta^{5+}$ and $W^{6+}$ is 0-8%; and/or $(Nb^{5+}+Ti^{4+})/(Nb^{5+}+Ti^{4+}+Ta^{5+}+W^{6+})$ is 0.9-1; and/or $(Nb^{5+}+Ti^{4+}+Ta^{5+}+W^{6+})/(Si^{4+}+B^{3+})$ is 0.03-0.35; and/or $(Nb^{5+}+Ti^{4+}+Ta^{5+}+W^{6+})/(La^{3+}+Y^{3+}+Gd^{3+}+Yb^{3+})$ is 0.04-0.4.

Furthermore, 1.1-3% of $Zn^{2+}$; and/or 0-2.5% of $Gd^{3+}$ (exclusive of 2.5%); and/or 0-3% of $Ti^{4+}$ (exclusive of 3%).

Furthermore, the refractive index nd of the above glass is 1.78-1.85, and the Abbe number vd is 40-50; when transmittance reaches 80%, the corresponding wave length is below 420 nm.

Furthermore, it contains no $Ta^{5+}$.

Furthermore, the refractive index nd of the glass is 1.78-1.95, the Abbe number νd is 32-50, the glass density is below 5 g/$cm^3$, and the upper limit of glass devitrification temperature is below 1250° C.

Glass preform is formed of the above optical glass.

The optical element is formed of the above optical glass.

The advantages of the present invention are as follows: The present invention provides an optical glass with excellent transmittance, having refractive index nd of 1.78-1.95 and Abbe number νd of 32-50, and provides a glass preform and an optical element formed of the above optical glass. The optical element made by the above optical glass and the above glass preform or optical element blank, such as lens, can be used for optical systems.

DETAILED DESCRIPTION

To achieve the aim of the present invention, the inventor finds through repeated studies that, the optical glass with specific glass compositions can achieve the aim of the present invention.

Below will give description to the reasons of defining the composition range of the present invention, and the content of each ingredient and the total amount are represented by cation %, unless otherwise specially noted. The content and total amount is mole content.

$Si^{4+}$ is a network formation cation of glass, with effects of maintaining the glass stability, keeping the viscosity suitable for forming molten glass, improving the chemical durability, etc. but if the content of $Si^{4+}$ is lower than 1%, the above effects cannot be obtained; if the content is more than 20%, it is difficult to achieve the desired refractive index and Abbe number, and glass devitrification is aggravated due to refractory property. Therefore, the content of $Si4^{+}$ is limited to 1-20%. Furthermore, the preferred lower limit of the content of $Si^{4+}$ is 2%, more preferably 5%; the preferred upper limit is 15%, more preferably 13%, and further preferably 12%.

$B^{3+}$ is a network formation cation of glass, as an indispensable ingredient of low dispersion glass, maintaining meltability, reducing liquidus temperature and improving glass stability. If the content is less than 25%, the glass stability is reduced, and the above effects cannot be obtained; if the content is more than 60%, it is difficult to meet the desired refractive index and the chemical durability will be worsened. Therefore, the content of $B^{3+}$ in the present invention is 25-60%. Furthermore, the preferred lower limit of the content of $B^{3+}$ is 30%, more preferably 32%; the preferred upper limit of the content of $B^{3+}$ is 55%, more preferably 48%.

In particular, when the content of $B^{3+}$ is 25-45%, furthermore, when the content of $B^{3+}$ is 30-45% (exclusive of 45%), the chemical stability and heat resistance of the glass can be improved, and it is more conducive for the glass to obtain refractive index nd of 1.85-1.95 and Abbe number νd of 32-40; when the content of $B^{3+}$ is 45-60%, furthermore, when the content of $B^{3+}$ is 45-55%, it is more conducive for the glass to obtain refractive index nd of 1.78-1.85 and Abbe number νd of 40-50.

In addition, both $B^{3+}$ and $Si^{4+}$ are network forming components. The total content of $B^{3+}$ and $Si^{4+}$ shall be more than 30% from the perspectives of achieving the desired refractive index and maintaining the glass forming property; but it's difficult to obtain the required optical property if the total content of $B^{3+}$ and $Si^{4+}$ exceeds 70%. Therefore, the total content of $B^{3+}$ and $Si^{4+}$ is limited to 30-70%, preferably 40-65%.

In particular, when the total content of $B^{3+}$ and $Si^{4+}$ is 30-60%, furthermore, when the total content of $B^{3+}$ and $Si^{4+}$ is 40-55%, it is more conducive for the glass to obtain a refractive index nd of 1.85-1.95, an Abbe number νd of 32-40 and improve the chemical stability and heat resistance of the glass; when the total content of $B^{3+}$ and $Si^{4+}$ is 40-65%, furthermore, when the total content of $B^{3+}$ and $Si^{4+}$ is 50-65%, it is more conducive for the glass to obtain a refractive index nd of 1.78-1.85 and an Abbe number νd of 40-50.

$La^{3+}$ is an essential component to achieve high refractive index and low dispersion. If the content is less than 10%, it is difficult to obtain the desired refractive index; if the content exceeds 40%, the upper limit of devitrification temperature will rise and the devitrification resistance will be poor. Therefore, the $La^{3+}$ content is 10-40%. Furthermore, the preferred upper limit of the $La^{3+}$ content is 35%, more preferably 30%; the preferred lower limit of the $La^{3+}$ content is 15%, more preferably 20%.

The invention preferably introduces two or more rare earth oxides simultaneously. The inventor found that the coexistence of two or more rare earth cations will increase overall rare earth cations in the glass components, and by introducing these components with similar effects, the optical property with high refractive index and low dispersion can be realized and the glass devitrification can be better controlled.

The coexistence of $Y^{3+}$ and $La^{3+}$ has the effects of lowering the upper limit of devitrification temperature and greatly improving the devitrification resistance. At the same time, the glass transmittance is more excellent by introducing $Y^{3+}$ than $Gd^{3+}$ and $Ta^{3+}$. However, if the $Y^{3+}$ content exceeds 15%, the upper limit of devitrification temperature will rise and the devitrification resistance will be poor. Therefore, the $Y^{3+}$ content is 0-15%. Furthermore, the preferred $Y^{3+}$ content is 0-13%, more preferably 0-10%.

$Gd^{3+}$ and $Yb^{3+}$ can coexist with $La^{3+}$ to have the effects of lowering the liquidus temperature, greatly improving the devitrification resistance and improving the chemical durability. The inventor found that the total content of $La^{3+}$, $Y^{3+}$, $Gd^{3+}$ and $Yb^{3+}$ is 20-55%, preferably 25-45%, from the perspectives of maintaining low dispersion, improving the refractive index and improving the devitrification resistance. The $Gd^{3+}$ content is 0-10%, preferably 0-8%, and more preferably not involved. The $Yb^{3+}$ content is 0-10%, preferably 0-5%, and more preferably not involved.

In particular, when the total content of $La^{3+}$, $Y^{3+}$, $Gd^{3+}$ and $Yb^{3+}$ is 25-50%, furthermore, when the total content of $La^{3+}$, $Y^{3+}$, $Gd^{3+}$ and $Yb^{3+}$is 30-50%, it is more conducive for the glass to obtain a refractive index nd of 1.85-1.95 and an Abbe number νd of 32-40, and the corresponding wavelength is below 420 nm when the transmittance reaches 70%.

In particular, when the $Gd^{3+}$ content is 1-8%, furthermore, when the $Gd^{3+}$ content is 2.5-8%, the liquidus temperature of the glass can be reduced and the moldability of the glass solution can be improved; when the $Gd^{3+}$ content is 0-8%, furthermore, when the $Gd^{3+}$ content is 0-2.5% (excluding 2.5%), the devitrification resistance of the glass can be more excellent.

In addition, if $(Si^{4+}+B^{3+})/(La^{3+}+Y^{3+}+Gd^{3+}+Yb^{3+})$ is less than 1, the glass moldability will fall; but if it exceeds 2.5, it is difficult to maintain the required optical property, thus, $(Si^{4+}+B^{3+})/(La^{3+}+Y^{3+}+Gd^{3+}+Yb^{3+})$ is greater than 1 but less than 2.5, preferably greater than 1 but less than 2.2, more preferably greater than 1 but less than 2.

In particular, when $(Si^{4+}+B^{3+})/(La^{3+}+Y^{3+}+Gd^{3+}+Yb^{3+})$ is greater than 1 but less than 2.2, furthermore, when $(Si^{4+}+B^{3+})/(La^{3+}+Y^{3+}+Gd^{3+}+Yb^{3+})$ is greater than 1 but less than 2, it is more conducive for the glass to obtain a refractive index nd of 1.85-1.95 and an Abbe number νd of 32-40, and the corresponding wavelength is below 420 nm when the glass transmittance reaches 70%; when $(Si^{4+}+B^{3+})/(La^{3+}+Y^{3+}+Gd^{3+}+Yb^{3+})$ is greater than or equal to 1.5 but less than 2.5, furthermore, when $(Si^{4+}+B^{3+})/(La^{3+}+Y^{3+}+Gd^{3+}+Yb^{3+})$ is 1.7-2.3, it is more conducive for the glass to obtain a refractive index nd of 1.78-1.85 and an Abbe number νd of 40-50, the corresponding wavelength is below 420 nm when the glass transmittance reaches 80%, and the devitrification property can be effectively improved.

In order to improve the refractive index of the glass while maintaining low dispersion, the invention introduces $La^{3+}$ and other rare earth components as glass components. However, if the refractive index is increased only by rare earth components, the thermal stability of the glass will be remarkably lowered, and the components, such as $Nb^{5+}$, $Ti^{4+}$, $Ta^{5+}$, $W^{6+}$, $Zr^{4+}$ and $Bi^{4+}$, have the effects of improving the refractive index and dispersion, thus, at least one or more components of $Nb^{5+}$, $Ta^{5+}$, $Ti^{4+}$, $W^{6+}$, $Zr^{4+}$ and $Bi^{4+}$ are required.

$Nb^{5+}$ has the effects of increasing the refractive index, lowering the upper limit of devitrification temperature of the glass and improving the devitrification resistance, and improving the thermal stability of the glass by coexisting with the glass component $La^{3+}$ at the same time. If the $Nb^{5+}$ content exceeds 20%, the upper limit of devitrification temperature of the glass will rise and the devitrification resistance will be poor, making it difficult to achieve the desired Abbe number and the glass pigmentation will be enhanced. Therefore, the $Nb^{5+}$ content is 0-20%, preferably 0-15%, more preferably 0.5-10%.

$Ti^{4+}$ also has the effects of increasing the refractive index, improving the chemical durability and devitrification resistance. If the $Ti^{4+}$ content exceeds 15%, the glass transition temperature or the upper limit of devitrification temperature will rise, the compression moulding property will become poor and the trend of glass pigmentation will be shown. Therefore, the $Ti^{4+}$ content is 0-15%, preferably 0-8%.

In particular, when the refractive index nd is greater than 1.85, the preferred $Ti^{4+}$ content is 1-8%, more preferably 3-8%, further preferably 3-7%; and when the refractive index nd is less than 1.85, the preferred $Ti^{4+}$ content is 0-8%, more preferably 0-5%, further preferably 0-3% (excluding 3%), much further preferably not involved.

$Ta^{5+}$ has the effects of achieving high refractive index and low dispersion and improving the glass stability. However, $Ta^{5+}$ is an expensive component, and if its content exceeds 10%, the upper limit of devitrification temperature will rise and the devitrification resistance will decrease. Therefore, the $Ta^{5+}$ content is 0-10%, preferably 0-7% and more preferably not involved.

$W^{6+}$ can increase the refractive index and lower the upper limit of devitrification temperature. However, if the $W^{6+}$ content exceeds 5%, the compression moulding property will decrease and the trend of glass pigmentation will be shown. Therefore, the $W^{6+}$ content is 0-5%.

In addition, in the components of $Nb^{5+}$, $Ti^{4+}$, $Ta^{5+}$ and $W^{6+}$ with which the glass refractive index can be improved, relatively speaking, $Nb^{5+}$ is not easy to cause oxidation and reduction reaction of the mould-pressing forming mould, not easy to cause the defects including the sintering of the glass and the mould-pressing forming mould, the atomization and damage of the glass surface. In addition, if the total amount of $Nb^{5+}$, $Ti^{4+}$, $Ta^{5+}$ and $W^{6+}$ exceeds 20%, it is difficult to maintain the required optical properties and vitrification. Therefore, the total amount of $Nb^{5+}$, $Ti^{4+}$, $Ta^{5+}$ and $W^{6+}$ is 0-20%, preferably 0-15%, and preferably only introducing $Nb^{5+}$.

Especially, when the total amount of $Nb^{5+}$, $Ti^{4+}$, $Ta^{5+}$ and $W^{6+}$ is 3-15%, the glass refractive index nd of 1.85-1.95 is more conducive to be obtained, with Abbe number νd of 32-40, and the moment the glass transmittance reaches 70%, the corresponding wave length is below 420 nm; when the total amount of $Nb^{5+}$, $Ti^{4+}$, $Ta^{5+}$ and $W^{6+}$ is 0-8%, the glass refractive index nd of 1.78-1.85 is more conductive to be obtained, with Abbe number νd of 40-50, and the moment the glass transmittance reaches 80%, the corresponding wave length is below 420 nm; meanwhile, the upper limit of devitrification temperature can be effectively decreased.

Controlling $(Nb^{5+}+Ti^{4+})/(Nb^{5+}+Ti^{4+}+Ta^{5+}+W^{6+})$ to be 0.7-1 can realize the optical properties and the thermal stability of the glass, but cannot easily cause the redox reaction with the mould-pressing forming mould. More preferably, $(Nb^{5+}+Ti^{4+})/(Nb^{5+}+Ti^{4+}+Ta^{5+}+W^{6+})$ is 0.8-1, further preferably $(Nb^{5+}+Ti^{4+})/(Nb^{5+}+Ti^{4+}+Ta^{5+}+W^{6+})$ is 0.9-1.

In addition, in order to achieve the required optical properties while maintaining the glassiness, control $(Nb^{5+}+Ti^{4+}+Ta^{5+}+W^{6+})/(Si^{4+}+B^{3+})$ to be 0.01-0.5, preferably 0.02-0.4, more preferably, 0.03-0.35; control $(Nb^{5+}+Ti^{4+}+Ta^{5+}+W^{6+})/(La^{3+}+Y^{3+}+Gd^{3+}+Yb^{3+})$ to be 0.02-0.6, preferably 0.03-0.5, more preferably 0.04-0.4.

$Zr^{4+}$ is also a component having an effect of increasing the refractive index. If the $Zr^{4+}$ content exceeds 15%, the glass will be refractory, with glass moldability will be decreased and the upper limit of devitrification temperature is tended to rise. Therefore, the $Zr^{4+}$ content is limited to 0-15%, preferably 0-10%.

$Zn^{2+}$ has an effect of lowering the glass melting or transition temperature. But in the present invention, if the content is more than 10%, the refractive index will be decreased, with the chemical durability of the glass lowered, as a result, the content range of $Zn^{2+}$ is 0-10%, preferably 0-5%, more preferably without $Zn^{2+}$.

In particular, when the content of $Zn^{2+}$ is 0-1.1% (exclusive of 1.1%), it is more conducive for the glass to obtain a refractive index nd of 1.85-1.95 and an Abbe number νd of 32-40; when the content of $Zn^{2+}$ is 0.5-5%, furthermore, when the content of $Zn^{2+}$ is 1.1-3%, it is more conducive for the glass to obtain a refractive index nd of 1.78-1.85 and an Abbe number νd of 40-50 and conductive to reduce the high temperature viscosity and the expansion coefficient of the glass. $Bi^{3+}$ has the effect of improving refractive index and stability of the glass, but its dispersion is high. If the content is more than 10%, the Abbe number cannot be achieved, with the transmittance of light decreased in visible region. Therefore, the content range of $Bi^{3+}$ is 0-10%, preferably 0-6% and more preferably without $Bi^{3+}$.

$Li^{+}$, $Na^{+}$ and $K^{+}$ are any components that improve glass meltability and decrease the glass transition temperature. If the total content of $Li^{+}$, $Na^{+}$ and $K^{+}$ exceeds 10%, it is difficult to achieve a desired refractive index and the glass stability and chemical durability are also decreased. Therefore, the total amount of $Li^{+}$, $Na^{+}$ and $K^{+}$ is less than 10%, preferably less than 5%, more preferably not contained.

$Ba^{2+}$, $Mg^{2+}$, $Ca^{2+}$ and $Sr^{2+}$ have effects of improving the glass meltability and decreasing glass transition temperature. However, if the total amount of $Ba^{2+}$, $Mg^{2+}$, $Ca^{2+}$ and $Sr^{2+}$ is more than 10%, then the glass devitrification resistance deteriorates, with the refractive index decreased and the chemical durability deteriorated. Therefore, the total amount of $Ba^{2+}$, $Mg^{2+}$, $Ca^{2+}$ and $Sr^{2+}$ is less than 10%, preferably less than 5%, more preferably not contained.

The optical glass of the present invention is the oxide glass, and the anionic component is actually composed of $O^{2-}$. As described above, a small amount of $Cl^-$ and $F^-$ can be added as a clarifying agent, but the content of O2⁻ is preferably greater than or equal to 98 anions %, more preferably greater than or equal to 99 anions %, further preferably greater than or equal to 99.5 anions %, most preferably 100 anions %.

The refractive index nd range of the optical glass of the present invention is 1.78-1.95. When the high refractive index is preferred, preferably the lower limit of the refractive index nd is 1.80; and proceeding from the glass stability, preferably the upper limit of the refractive index is 1.92.

The Abbe number vd of the optical glass of the present invention is 32-50. When chromatic aberration is corrected in combination with lens made of highly dispersible glass, large Abbe number vd is favorable. From this point of view, the lower limit of the Abbe number vd is preferably 35, and on the other hand, alleviating the upper limit of Abbe number vd plays a favorable role in maintaining and improving the stability of the glass. From this point of view, the upper limit of the Abbe number vd is preferably 48.

Light transmissivity of the optical glass of the present invention will be described in the following paragraphs.

In the optical glass of the present invention, when the glass nd is greater than or equal to 1.85, the corresponding wavelength ($\lambda_{70}$) is less than or equal to 420 nm when its glass transmittance reaches 70%; when the glass nd is less than 1.85, the corresponding wavelength ($\lambda_{80}$) is less than or equal to 420 nm when its glass transmittance reaches 80%.

In the present invention, $\lambda_{70}$ is preferably less than or equal to 410 nm, then preferably less than or equal to 400 nm, and more preferably less than or equal to 390 nm.

In the present invention, $\lambda_{80}$ is preferably less than or equal to 410 nm, then preferably less than or equal to 400 nm, and more preferably less than or equal to 390 nm.

The above $\lambda_{70}$ or $\lambda_{80}$ is the wavelength with the light transmittance of 70% or 80% in the wavelength range of 280-700 nm. Here, the light transmittance is the spectral transmission obtained by using a glass sample with the planes which are grinded into the thickness of 10.0±0.1 mm & paralleled to one another and from the incident light which comes from the vertical direction of the grinded planes. The spectral transmittance also includes the reflection loss of the light on the sample surface. Besides, the above grinding means that the surface roughness, relative to a wavelength of a determined wavelength domain, is smoothed to be in a small enough state.

The upper limit of devitrification temperature of the optical glass provided by the present invention is preferably less than or equal to 1250° C., more preferably less than or equal to 1200° C., further preferably less than or equal to 1150° C., and most preferably less than or equal to 1100° C.

The density ρ of the optical glass provided by the present invention is preferably less than or equal to 5 $g/cm^3$, more preferably less than or equal to 4.95 $g/cm^3$, further preferably less than or equal to 4.8 $g/cm^3$, furthermore preferably less than or equal to 4.5 $g/cm^3$, and most preferably less than or equal to 4.3 $g/cm^3$.

A manufacturing method of the optical glass provided by the present invention will be described in the following paragraphs.

Corresponding to target glass composition, powdery compound materials or broken glass materials are weighed and mixed, and then heated and molten after being supplied to a platinum alloy melting container. After the above raw materials are molten completely and vitrified, temperature of the molten glass rises and the molten glass is clarified. The clarified molten glass is unified by virtue of mixing of a mixer, and then continuously supplied to a glass outflow pipe to outflow for quenching and solidification, so as to obtain a glass shaped object.

Besides, from the perspective of uniformly low-colored glass with stable features such as optical feature, the molten temperature of the optical glass is preferably within the scope of 1300-1450° C.

A glass preform and an optical element provided by the present invention are made of the optical glass provided by the present invention. The glass preform and the optical element provided by the present invention have such features as high refractive index and low dispersion, are free of Ge and other expensive ingredients. As a result of this, the optical elements such as various lenses and prisms with high optical value can be provided with low cost.

Embodiments

The technical scheme of the present invention will be further illustrated by the following embodiments, but the present invention is not limited by these embodiments. By referring to the following embodiments and applying a method of regulating contents of the above various glass ingredients, the optical glass provided by the present invention can be obtained.

Firstly, nitrate, carbonate, sulfate, hydroxide, oxide, boric acid and so on are applied to obtain an oxide glass of a composition (represented by cation %) shown in Tables 1-9; various raw material powder is weighed for fully mixing to obtain a mixed raw material; the mixed raw material is placed into a platinum made crucible to be heated, molten, clarified and mixed at 1300-1450° C., so as to obtain a uniform molten glass. The molten glass is flowed into a preheated casting mould for quenching, and then slowly cooled after being kept for 2 h at the temperature nearby a glass transition temperature, so as to obtain various optical glasses in embodiments 1-16.

Besides, all anion ingredients of embodiments 1-72 are $O^{2-}$. The features of glasses are determined by the methods shown as follows:

(1) Refractive Index (nd) and Abbe Number (vd)

The refractive index and Abbe number are tested as per *GB/T* 7962.1-1987 *Colorless Optical Glass Test Methods: Refractive Index and Coefficient of Dispersion.*

(2) Pigmentation Degree of Glass ($\lambda_{70}$ and $\lambda_{80}$)

Pigmentation degree is applied to represent the characteristic of short wave transmission spectrum of the optical glass. The glass is made into a sample with thickness of 10 mm±0.1 mm. When the glass nd is greater than or equal to 1.85, the corresponding wavelength ($\lambda_{70}$) is tested when the glass transmittance reaches 70%; when the glass nd is less than 1.85, the corresponding wavelength ($\lambda_{80}$) is tested when the glass transmittance reaches 80%.

(3) Glass Density (ρ)

The density (φ is tested as per *GB/T* 7962.20-1987 *Colorless Optical Glass Test Methods—Density.*

(4) Upper Limit of Devitrification Temperature

The devitrification property of the glass is tested by a temperature gradient furnace method which comprises the following steps: processing the glass into samples (180 mm×10 mm×10 mm), polishing lateral sides, placing the samples into a furnace having a temperature gradient, taking out the samples after the temperature is kept for 4 hours, and observing the devitrification of glass under a microscope, wherein the maximum temperature corresponding to the appearance of crystals is the upper limit of devitrification temperature of the glass.

TABLE 1

| | Embodiments 1-8 | | | | | | | |
|---|---|---|---|---|---|---|---|---|
| Cation | 1 | 2 | 3 | 4 | 5 | 6 | 7 | 8 |
| $B^{3+}$ | 30.1 | 48.9 | 55.6 | 32.9 | 35.7 | 45.9 | 47.2 | 53.5 |
| $Si^{4+}$ | 14.4 | 7.8 | 6.4 | 12.8 | 10.3 | 8.3 | 5.8 | 7.6 |
| $B^{3+} + Si^{4+}$ | 44.5 | 56.7 | 62 | 45.7 | 46 | 54.2 | 53 | 61.1 |
| $La^{3+}$ | 30.7 | 22.9 | 18.8 | 34.7 | 25.5 | 24.8 | 30.6 | 22.5 |
| $Y^{3+}$ | 4.7 | 8.6 | 7.1 | 3.4 | 8.5 | 7.8 | 4.4 | 8.6 |
| $Gd^{3+}$ | 6 | 0 | 0 | 0 | 4.8 | 0 | 0 | 0 |
| $Yb^{3+}$ | 0 | 0 | 0 | 0 | 0 | 0 | 0 | 0 |
| $\Sigma Ln^{3+}$ | 41.4 | 31.5 | 25.9 | 38.1 | 38.8 | 32.6 | 35 | 31.1 |
| $(B^{3+} + Si^{4+})/\Sigma Ln^{3+}$ | 1.07 | 1.8 | 2.39 | 1.19 | 1.19 | 1.66 | 1.51 | 1.96 |
| $Nb^{5+}$ | 3.8 | 4.9 | 4.7 | 9.1 | 6.5 | 3.3 | 5.5 | 1.9 |
| $Ti^{4+}$ | 5.7 | 0 | 0 | 7.0 | 4.3 | 0 | 3.1 | 0 |
| $Ta^{5+}$ | 0 | 0 | 0 | 0 | 0 | 0 | 0 | 0 |
| $W^{6+}$ | 0 | 0 | 2.0 | 0 | 0 | 0 | 0 | 0 |
| $\Sigma HR$ | 9.5 | 4.9 | 6.7 | 16.1 | 10.8 | 3.3 | 8.6 | 1.9 |
| $(Nb^{5+} + Ti^{4+})/\Sigma HR$ | 1 | 1 | 0.7 | 1 | 1 | 1 | 1 | 1 |
| $\Sigma HR/(B^{3+} + Si^{4+})$ | 0.21 | 0.08 | 0.1 | 0.35 | 0.23 | 0.06 | 0.16 | 0.03 |
| $\Sigma HR/\Sigma Ln^{3+}$ | 0.23 | 0.16 | 0.25 | 0.42 | 0.27 | 0.1 | 0.24 | 0.06 |
| $Zr^{4+}$ | 4.6 | 5.2 | 2.9 | 0.1 | 4.4 | 6.9 | 3.4 | 4.8 |
| $Zn^{2+}$ | 0 | 1.7 | 2.5 | 0 | 0 | 3 | 0 | 1.1 |
| $Bi^{3+}$ | 0 | 0 | 0 | 0 | 0 | 0 | 0 | 0 |
| $\Sigma R^+$ | 0 | 0 | 0 | 0 | 0 | 0 | 0 | 0 |
| $\Sigma R^{2+}$ | 0 | 0 | 0 | 0 | 0 | 0 | 0 | 0 |
| Total | 100 | 100 | 100 | 100 | 100 | 100 | 100 | 100 |
| nd | 1.910 | 1.835 | 1.810 | 1.904 | 1.901 | 1.830 | 1.831 | 1.804 |
| vd | 35.7 | 42.7 | 45.9 | 37. 8 | 37.1 | 43.1 | 43.2 | 46.6 |
| ($g/cm^3$) | 5.0 | 4.57 | 4.45 | 4.9 | 4.95 | 4.59 | 4.63 | 4.49 |
| $\lambda_{70}$ (nm) | 400 | | | 395 | 390 | | | |
| $\lambda_{80}$ (nm) | | 400 | 395 | | | 405 | 410 | 390 |
| Upper limit of devitrification temperature (° C.) | 1250 | 1190 | 1140 | 1200 | 1230 | 1180 | 1150 | 1140 |

TABLE 2

| | Embodiments 9-16 | | | | | | | |
|---|---|---|---|---|---|---|---|---|
| Cation | 9 | 10 | 11 | 12 | 13 | 14 | 15 | 16 |
| $B^{3+}$ | 40.2 | 52.1 | 51.6 | 34.6 | 36.3 | 46.8 | 40.2 | 54.5 |
| $Si^{4+}$ | 8.3 | 4.6 | 8.4 | 7.9 | 9.3 | 5.3 | 4.7 | 6.6 |
| $B^{3+} + Si^{4+}$ | 48.5 | 56.7 | 60 | 42.5 | 45.6 | 52.1 | 44.9 | 61.1 |
| $La^{3+}$ | 27.4 | 18.8 | 23.8 | 35.3 | 28.5 | 30.1 | 39.8 | 25.1 |
| $Y^{3+}$ | 9.1 | 10.6 | 7.5 | 3.4 | 8.1 | 3.9 | 4.4 | 4.6 |
| $Gd^{3+}$ | 2.5 | 0 | 0 | 0 | 1.9 | 0 | 0 | 0 |
| $Yb^{3+}$ | 0 | 0 | 0 | 0 | 0 | 2 | 0 | 0 |
| $\Sigma Ln^{3+}$ | 39 | 29.4 | 31.3 | 38.7 | 38.5 | 36 | 44.2 | 29.7 |
| $(B^{3+} + Si^{4+})/\Sigma Ln^{3+}$ | 1.24 | 1.92 | 1.91 | 1.09 | 1.18 | 1.44 | 1.01 | 2.05 |
| $Nb^{5+}$ | 4.8 | 6.9 | 3.1 | 9.7 | 7.4 | 3.4 | 5 | 2.8 |
| $Ti^{4+}$ | 1.2 | 0 | 0 | 3.0 | 5.3 | 0 | 4 | 0 |
| $Ta^{5+}$ | 0 | 0 | 0 | 0 | 0 | 0.5 | 0 | 0 |
| $W^{6+}$ | 0 | 0 | 0 | 0 | 0 | 0.2 | 0 | 0 |
| $\Sigma HR$ | 6 | 6.9 | 3.1 | 12.7 | 12.7 | 4.1 | 9 | 2.8 |
| $(Nb^{5+} + Ti^{4+})/\Sigma HR$ | 1 | 1 | 1 | 1 | 1 | 0.82 | 1 | 1 |
| $\Sigma HR/(B^{3+} + Si^{4+})$ | 0.12 | 0.12 | 0.05 | 0.29 | 0.27 | 0.07 | 0.2 | 0.04 |
| $\Sigma HR/\Sigma Ln^{3+}$ | 0.15 | 0.23 | 0.1 | 0.32 | 0.32 | 0.11 | 0.2 | 0.09 |
| $Zr^{4+}$ | 5.1 | 6.3 | 4.4 | 5.1 | 3.2 | 7.1 | 1.9 | 2.7 |
| $Zn^{2+}$ | 0 | 0.7 | 1.2 | 0 | 0 | 0.7 | 0 | 2.7 |
| $Bi^{3+}$ | 0 | 0 | 0 | 1 | 0 | 0 | 0 | 0 |
| $\Sigma R^+$ | 0 | 0 | 0 | 0 | 0 | 1 | 0 | 0 |
| $\Sigma R^{2+}$ | 1.4 | 0 | 0 | 0 | 0 | 0 | 0 | 1 |
| Total | 100 | 100 | 100 | 100 | 100 | 100 | 100 | 100 |
| nd | 1.910 | 1.831 | 1.807 | 1.902 | 1.902 | 1.805 | 9110 | 1’807 |
| vd | 35.4 | 42.5 | 45.9 | 37.1 | 37.0 | 46.1 | 35.4 | 46.5 |
| ρ | 4.9 | 4.61 | 4.47 | 4.85 | 4.95 | 4.50 | 5.0 | 4.48 |
| $\lambda_{70}$ (nm) | 400 | | | 395 | 390 | | 390 | |
| $\lambda_{80}$ (nm) | | 390 | 400 | | | 395 | | 390 |

TABLE 2-continued

| Cation | Embodiments 9-16 | | | | | | | |
|---|---|---|---|---|---|---|---|---|
| | 9 | 10 | 11 | 12 | 13 | 14 | 15 | 16 |
| Upper limit of devitrification temperature (° C.) | 1220 | 1190 | 1180 | 1250 | 1200 | 1150 | 1200 | 1160 |

TABLE 3

| Cation | Embodiments 17-24 | | | | | | | |
|---|---|---|---|---|---|---|---|---|
| | 17 | 18 | 19 | 20 | 21 | 22 | 23 | 24 |
| $B^{3+}$ | 34.6 | 37.2 | 31.7 | 34.5 | 28.7 | 38.5 | 40.7 | 33.7 |
| $Si^{4+}$ | 11.5 | 7.1 | 15.4 | 9.4 | 17.6 | 12.5 | 17.2 | 8.4 |
| $La^{3+}$ | 26.4 | 23.7 | 20.6 | 25.6 | 22.1 | 19.4 | 15.9 | 30 |
| $Y^{3+}$ | 8.2 | 6.4 | 2.8 | 7.2 | 8.5 | 5.2 | 12.4 | 3.8 |
| $Gd^{3+}$ | 3.6 | 5.2 | 7.2 | 4.3 | 4.7 | 6.1 | 1.5 | 2.3 |
| $Yb^{3+}$ | 1.7 | 0 | 0 | 0 | 0.1 | 2.4 | 0 | 0 |
| $Nb^{5+}$ | 4.6 | 3.7 | 2.5 | 5.8 | 8.2 | 6.6 | 9.4 | 10.5 |
| $Ti^{4+}$ | 3.7 | 5.7 | 10.2 | 6.7 | 5.4 | 7.3 | 2.2 | 4.9 |
| $Ta^{5+}$ | 0 | 0 | 1.4 | 0 | 0 | 0.2 | 0 | 0 |
| $W^{6+}$ | 2.3 | 3.8 | 0 | 0 | 0 | 0.3 | 0 | 0 |
| $Zr^{4+}$ | 2.7 | 4.6 | 8.2 | 5.3 | 3.2 | 1.5 | 0 | 6.4 |
| $Zn^{2+}$ | 0 | 0 | 0 | 1.2 | 0 | 0 | 0.7 | 0 |
| $Bi^{3+}$ | 0 | 1.4 | 0 | 0 | 0.7 | 0 | 0 | 0 |
| $\Sigma R^{+}$ | 0.7 | 0 | 0 | 0 | 0.5 | 0 | 0 | 0 |
| $\Sigma R^{2+}$ | 0 | 1.2 | 0 | 0 | 0.3 | 0 | 0 | 0 |
| Total | 100 | 100 | 100 | 100 | 100 | 100 | 100 | 100 |
| nd | 1.911 | 1.906 | 1.892 | 1.914 | 1.908 | 1.872 | 1.869 | 1.924 |
| vd | 35.2 | 37.4 | 33.5 | 36.4 | 33.4 | 38.1 | 38.5 | 37.2 |
| ($g/cm^3$) | 4.82 | 4.95 | 5.0 | 4.92 | 4.85 | 4.93 | 4.84 | 4.91 |
| $\lambda_{70}$ (nm) | 405 | 408 | 410 | 400 | 396 | 401 | 392 | 395 |
| $\lambda_{80}$ (nm) | | | | | | | | |
| Upper limit of devitrification temperature (° C.) | 1220 | 1230 | 1225 | 1230 | 1235 | 1240 | 1225 | 1230 |
| $B^{3+} + Si^{4+}$ | 46.1 | 44.3 | 47.1 | 43.9 | 46.3 | 51 | 57.9 | 42.1 |
| $ZLn^{3+}$ | 39.9 | 35.3 | 30.6 | 37.1 | 35.4 | 33.1 | 29.8 | 36.1 |
| $(B^{3+} + Si^{4+})/\Sigma Ln^{3+}$ | 1.155 | 1.255 | 1.539 | 1.183 | 1.308 | 1.541 | 1.943 | 1.166 |
| $\Sigma HR$ | 10.6 | 13.2 | 14.1 | 12.5 | 13.6 | 14.4 | 11.6 | 15.4 |
| $(Nb^{5+} + Ti^{4+})/\Sigma HR$ | 0.783 | 0.712 | 0.901 | 1 | 1 | 0.965 | 1 | 1 |
| $\Sigma HR/(B^{3+} + Si^{4+})$ | 0.23 | 0.298 | 0.299 | 0.285 | 0.294 | 0.282 | 0.200 | 0.366 |
| $\Sigma HR/\Sigma Ln^{3+}$ | 0.266 | 0.374 | 0.461 | 0.337 | 0.384 | 0.435 | 0.389 | 0.427 |

TABLE 4

| Cation | Embodiment 25-32 | | | | | | | |
|---|---|---|---|---|---|---|---|---|
| | 25 | 26 | 27 | 28 | 29 | 30 | 31 | 32 |
| $B^{3+}$ | 27.4 | 33.1 | 35.8 | 30.1 | 32.3 | 40.2 | 36.2 | 28.6 |
| $Si^{4+}$ | 16.2 | 10.3 | 11.4 | 10.2 | 15.8 | 8 | 7.3 | 11.5 |
| $La^{3+}$ | 15.4 | 17.1 | 24.5 | 13.4 | 22.1 | 27.1 | 18.8 | 24.5 |
| $Y^{3+}$ | 13.2 | 4.3 | 8.6 | 11.5 | 6.1 | 0 | 9.2 | 7.1 |
| $Gd^{3+}$ | 3.7 | 8.2 | 5.3 | 7.4 | 4.5 | 2.6 | 6.5 | 4 |
| $Yb^{3+}$ | 1.1 | 0 | 0 | 0 | 0.4 | 0 | 0.5 | 0 |
| $Nb^{5+}$ | 15.2 | 12.4 | 5.7 | 0.7 | 6.9 | 10.2 | 0 | 5.8 |
| $Ti^{4+}$ | 0 | 1.7 | 5.1 | 13.1 | 5.7 | 6.7 | 13.3 | 6.4 |
| $Ta^{5+}$ | 0.5 | 0 | 0 | 0 | 0 | 0 | 0 | 0 |
| $W^{6+}$ | 0 | 0 | 0 | 0.6 | 0 | 0 | 0 | 0 |
| $Zr^{4+}$ | 7.3 | 9.1 | 3.6 | 10.5 | 6.2 | 5.2 | 8.2 | 12.1 |
| $Zn^{2+}$ | 0 | 0 | 0 | 0 | 0 | 0 | 0 | 0 |

TABLE 4-continued

| Cation | Embodiment 25-32 | | | | | | | |
|---|---|---|---|---|---|---|---|---|
| | 25 | 26 | 27 | 28 | 29 | 30 | 31 | 32 |
| $Bi^{3+}$ | 0 | 1.3 | 0 | 0.4 | 0 | 0 | 0 | 0 |
| $\Sigma R^{+}$ | 0 | 0 | 0 | 2.1 | 0 | 0 | 0 | 0 |
| $\Sigma R^{2+}$ | 0 | 2.5 | 0 | 0 | 0 | 0 | 0 | 0 |
| Total | 100 | 100 | 100 | 100 | 100 | 100 | 100 | 100 |
| nd | 1.876 | 1.895 | 1.910 | 1.875 | 1.904 | 1.911 | 1.892 | 1.912 |
| vd | 33.5 | 35.6 | 37.1 | 36.2 | 35.8 | 38.2 | 37.6 | 33.4 |
| $(g/cm^3)$ | 4.89 | 4.90 | 4.93 | 4.80 | 4.89 | 5.00 | 4.92 | 4.93 |
| $\lambda_{70}$ (nm) | 390 | 392 | 398 | 410 | 395 | 394 | 412 | 398 |
| $\lambda_{80}$ (nm) | | | | | | | | |
| Upper limit of devitrification temperature (° C.) | 1210 | 1220 | 1215 | 1230 | 1200 | 1215 | 1205 | 1215 |
| $B^{3+} + Si^{4+}$ | 43.6 | 43.4 | 47.2 | 40.3 | 48.1 | 48.2 | 43.5 | 40.1 |
| $\Sigma Ln^{3+}$ | 33.4 | 29.6 | 38.4 | 32.3 | 33.1 | 29.7 | 35 | 35.6 |
| $(B^{3+} + Si^{4+})/\Sigma Ln^{3+}$ | 1.305 | 1.466 | 1.229 | 1.248 | 1.453 | 1.623 | 1.243 | 1.126 |
| ΣHR | 15.7 | 14.1 | 10.8 | 14.4 | 12.6 | 16.9 | 13.3 | 12.2 |
| $(Nb^{5+} + Ti^{4+})/\Sigma HR$ | 0.968 | 1 | 1 | 0.958 | 1 | 1 | 1 | 1 |
| $\Sigma HR/(B^{3+} + Si^{4+})$ | 0.360 | 0.325 | 0.229 | 0.357 | 0.262 | 0.351 | 0.306 | 0.304 |
| $\Sigma HR/\Sigma Ln^{3+}$ | 0.470 | 0.476 | 0.281 | 0.446 | 0.381 | 0.569 | 0.38 | 0.343 |

TABLE 5

| Cation | Embodiment 33-40 | | | | | | | |
|---|---|---|---|---|---|---|---|---|
| | 33 | 34 | 35 | 36 | 37 | 38 | 39 | 40 |
| $B^{3+}$ | 34.7 | 35.9 | 41.6 | 34.6 | 42.8 | 38.8 | 35.7 | 35.7 |
| $Si^{4+}$ | 11.2 | 5.7 | 9 | 10.8 | 8.4 | 18.2 | 12.4 | 11.7 |
| $La^{3+}$ | 23.6 | 27.3 | 21.1 | 26.2 | 33.4 | 18.3 | 20.6 | 23.6 |
| $Y^{3+}$ | 7.8 | 2.5 | 5.1 | 9.1 | 3.5 | 14.2 | 11.5 | 7.4 |
| $Gd^{3+}$ | 5.5 | 5.1 | 7.3 | 3.8 | 4.3 | 3.3 | 6.2 | 5.7 |
| $Yb^{3+}$ | 0.3 | 3.4 | 0 | 0 | 0 | 0 | 0 | 0.5 |
| $Nb^{5+}$ | 7.9 | 5.4 | 6.6 | 5.9 | 2.4 | 2.6 | 0.8 | 6.7 |
| $Ti^{4+}$ | 3.8 | 2.6 | 6.7 | 5.1 | 1.6 | 3.2 | 1.6 | 4.2 |
| $Ta^{5+}$ | 0 | 0 | 0 | 0 | 0 | 0 | 0 | 0 |
| $W^{6+}$ | 0 | 2.1 | 0 | 0 | 0 | 0 | 0 | 0 |
| $Zr^{4+}$ | 5.2 | 7.2 | 2.6 | 4.2 | 3.6 | 1.4 | 11.2 | 4.5 |
| $Zn^{2+}$ | 0 | 0.6 | 0 | 0 | 0 | 0 | 0 | 0 |
| $Bi^{3+}$ | 0 | 0 | 0 | 0.3 | 0 | 0 | 0 | 0 |
| $\Sigma R^{+}$ | 0 | 0.7 | 0 | 0 | 0 | 0 | 0 | 0 |
| $\Sigma R^{2+}$ | 0 | 1.5 | 0 | 0 | 0 | 0 | 0 | 0 |
| Total | 100 | 100 | 100 | 100 | 100 | 100 | 100 | 100 |
| nd | 1.912 | 1.908 | 1.901 | 1.913 | 1.932 | 1.872 | 1.900 | 1.901 |
| vd | 37.0 | 36.8 | 38.4 | 36.8 | 38.5 | 37.4 | 37.1 | 37.1 |
| $(g/cm^3)$ | 4.92 | 4.89 | 4.91 | 4.93 | 4.92 | 4.92 | 5.00 | 4.89 |
| $\lambda_{70}$ (nm) | 390 | 395 | 397 | 396 | 391 | 394 | 391 | 393 |
| $\lambda_{80}$ (nm) | | | | | | | | |
| Upper limit of devitrification temperature (° C.) | 1220 | 1215 | 1230 | 1220 | 1230 | 1210 | 1205 | 1210 |
| $B^{3+} + Si^{4+}$ | 45.9 | 41.6 | 50.6 | 45.4 | 51.2 | 57 | 48.1 | 47.4 |
| $\Sigma Ln^{3+}$ | 37.2 | 38.3 | 33.5 | 39.1 | 41.2 | 35.8 | 38.3 | 37.2 |
| $(B^{3+} + Si^{4+})/\Sigma Ln^{3+}$ | 1.234 | 1.087 | 1.510 | 1.161 | 1.243 | 1.592 | 1.256 | 1.274 |
| ΣHR | 11.7 | 10.1 | 13.3 | 11 | 4 | 5.8 | 2.4 | 10.9 |
| $(Nb^{5+} + Ti^{4+})/\Sigma HR$ | 1 | 0.792 | 1 | 1 | 1 | 1 | 1 | 1 |
| $\Sigma HR/(B^{3+} + Si^{4+})$ | 0.255 | 0.243 | 0.263 | 0.242 | 0.0781 | 0.102 | 0.05 | 0.23 |
| $\Sigma HR/\Sigma Ln^{3+}$ | 0.315 | 0.264 | 0.397 | 0.281 | 0.097 | 0.162 | 0.063 | 0.293 |

TABLE 6

| Cation | Embodiments 41-48 | | | | | | | |
|---|---|---|---|---|---|---|---|---|
| | 41 | 42 | 43 | 44 | 45 | 46 | 47 | 48 |
| $B^{3+}$ | 43.1 | 38.5 | 34.5 | 37.7 | 35.7 | 50.4 | 45.5 | 46.1 |
| $Si^{4+}$ | 17.6 | 18.3 | 11.2 | 5.2 | 11.1 | 7.1 | 2.6 | 11.2 |
| $La^{3+}$ | 14.7 | 24.3 | 24.9 | 14.3 | 25.5 | 22.4 | 18.2 | 18.4 |
| $Y^{3+}$ | 3.2 | 4.1 | 7.5 | 13.2 | 8 | 8.4 | 7.1 | 4.5 |
| $Gd^{3+}$ | 6.6 | 4.9 | 6.3 | 7.5 | 4.6 | 0 | 0 | 2.3 |
| $Yb^{3+}$ | 3.2 | 0 | 0 | 0 | 0 | 0 | 0 | 2.1 |
| $Nb^{5+}$ | 2.7 | 1.5 | 6.2 | 7.8 | 5.8 | 5.2 | 12.4 | 4.5 |
| $Ti^{4+}$ | 1.4 | 2.1 | 4.7 | 6 | 3.2 | 0 | 0 | 0.4 |
| $Ta^{5+}$ | 0 | 0 | 0 | 0 | 0 | 0 | 0.6 | 0 |
| $W^{6+}$ | 0 | 0 | 0.5 | 0 | 0 | 0 | 1.5 | 0 |
| $Zr^{4+}$ | 1.2 | 2.6 | 4.2 | 8.3 | 6.1 | 4.9 | 9.1 | 3.2 |
| $Zn^{2+}$ | 0 | 0 | 0 | 0 | 0 | 1.6 | 2.7 | 4.4 |
| $Bi^{3+}$ | 2.2 | 0 | 0 | 0 | 0 | 0 | 0 | 0 |
| $\Sigma R^{+}$ | 0 | 3.7 | 0 | 0 | 0 | 0 | 0 | 0.8 |
| $\Sigma R^{2+}$ | 4.1 | 0 | 0 | 0 | 0 | 0 | 0.3 | 2.1 |
| Total | 100 | 100 | 100 | 100 | 100 | 100 | 100 | 100 |
| nd | 1.881 | 1.902 | 1.910 | 1.875 | 1.905 | 1.834 | 1.815 | 1.820 |
| vd | 38.8 | 37.5 | 36.7 | 37.2 | 37.1 | 42.6 | 43.8 | 43.3 |
| $(g/cm^3)$ | 4.95 | 4.91 | 4.93 | 4.92 | 4.90 | 4.52 | 4.45 | 4.51 |
| $\lambda_{70}$ (nm) | 392 | 393 | 395 | 397 | 393 | | | |
| $\lambda_{80}$ (nm) | | | | | | 395 | 394 | 390 |
| Upper limit of devitrification temperature (° C.) | 1205 | 1210 | 1220 | 1215 | 1210 | 1135 | 1140 | 1155 |
| $B^{3+} + Si^{4+}$ | 60.7 | 56.8 | 45.7 | 42.9 | 46.8 | 57.5 | 48.1 | 57.3 |
| $\Sigma Ln^{3+}$ | 27.7 | 33.3 | 38.7 | 35 | 38.1 | 30.8 | 25.3 | 27.3 |
| $(B^{3+} + Si^{4+})/\Sigma Ln^{3+}$ | 2.191 | 1.706 | 1.181 | 1.226 | 1.228 | 1.867 | 1.901 | 2.099 |
| $\Sigma HR$ | 4.1 | 3.6 | 11.4 | 13.8 | 9 | 5.2 | 14.5 | 4.9 |
| $(Nb^{5+} + Ti^{4+})/\Sigma HR$ | 1 | 1 | 0.956 | 1 | 1 | 1 | 0.855 | 1 |
| $\Sigma HR/(B^{3+} + Si^{4+})$ | 0.068 | 0.063 | 0.25 | 0.322 | 0.192 | 0.090 | 0.302 | 0.086 |
| $\Sigma HR/\Sigma Ln^{3+}$ | 0.148 | 0.108 | 0.295 | 0.394 | 0.236 | 0.169 | 0.573 | 0.18 |

TABLE 7

| Cation | Embodiments 49-56 | | | | | | | |
|---|---|---|---|---|---|---|---|---|
| | 49 | 50 | 51 | 52 | 53 | 54 | 55 | 56 |
| $B^{3+}$ | 52.1 | 56.4 | 48.1 | 46.2 | 57.1 | 45.6 | 47.2 | 49.6 |
| $Si^{4+}$ | 3.4 | 2 | 6.4 | 10.2 | 4.2 | 12.2 | 5.2 | 7.2 |
| $La^{3+}$ | 16.3 | 20.1 | 18.3 | 17.2 | 22.6 | 15.9 | 30 | 19.2 |
| $Y^{3+}$ | 12.5 | 4.3 | 6.5 | 9.4 | 7.3 | 8.4 | 0 | 11.4 |
| $Gd^{3+}$ | 0 | 1.5 | 0 | 0 | 0 | 2 | 0 | 0 |
| $Yb^{3+}$ | 1.2 | 0 | 0 | 0 | 0 | 3.3 | 4.7 | 0 |
| $Nb^{5+}$ | 8.2 | 6.7 | 10.5 | 2.5 | 3.5 | 0 | 4.4 | 5.7 |
| $Ti^{4+}$ | 0 | 1.1 | 0 | 0 | 0 | 2.1 | 0 | 0 |
| $Ta^{5+}$ | 0 | 0.6 | 0 | 0 | 0 | 0.6 | 0 | 0 |
| $W^{6+}$ | 0 | 2.5 | 0 | 0 | 0 | 0 | 0 | 0 |
| $Zr^{4+}$ | 1.5 | 2.6 | 8.2 | 10.4 | 4.1 | 6.3 | 7.2 | 5.4 |
| $Zn^{2+}$ | 3.3 | 1.4 | 2 | 4.1 | 1.2 | 1.6 | 1.3 | 1.5 |
| $Bi^{3+}$ | 1.5 | 0 | 0 | 0 | 0 | 0 | 0 | 0 |
| $\Sigma R^{+}$ | 0 | 0.8 | 0 | 0 | 0 | 0.6 | 0 | 0 |
| $\Sigma R^{2+}$ | 0 | 0 | 0 | 0 | 0 | 1.4 | 0 | 0 |
| Total | 100 | 100 | 100 | 100 | 100 | 100 | 100 | 100 |
| nd | 1.804 | 1.793 | 1.832 | 1.830 | 1.791 | 1.817 | 1.841 | 1.832 |
| vd | 48.5 | 47.6 | 41.6 | 42.5 | 46.3 | 46.5 | 41.9 | 42.3 |
| $(g/cm^3)$ | 4.66 | 4.35 | 4.48 | 4.51 | 4.62 | 4.50 | 4.47 | 4.60 |
| $\lambda_{70}$ (nm) | | | | | | | | |
| $\lambda_{80}$ (nm) | 389 | 412 | 391 | 393 | 390 | 398 | 390 | 390 |
| Upper limit of devitrification temperature (° C.) | 1120 | 1130 | 1125 | 1110 | 1150 | 1160 | 1145 | 1105 |
| $B^{3+} + Si^{4+}$ | 55.5 | 58.4 | 54.5 | 56.4 | 61.3 | 57.8 | 52.4 | 56.8 |
| $\Sigma Ln^{3+}$ | 30 | 25.9 | 24.8 | 26.6 | 29.9 | 29.6 | 34.7 | 30.6 |
| $(B^{3+} + Si^{4+})/\Sigma Ln^{3+}$ | 1.85 | 2.2548 | 2.1976 | 2.1203 | 2.0502 | 1.9527 | 1.5101 | 1.8562 |
| $\Sigma HR$ | 8.2 | 10.9 | 10.5 | 2.5 | 3.5 | 2.7 | 4.4 | 5.7 |
| $(Nb^{5+} + Ti^{4+})/\Sigma HR$ | 1 | 0.716 | 1 | 1 | 1 | 0.778 | 1 | 1 |
| $\Sigma HR/(B^{3+} + Si^{4+})$ | 0.148 | 0.187 | 0.193 | 0.044 | 0.057 | 0.047 | 0.084 | 0.100 |
| $\Sigma HR/\Sigma Ln^{3+}$ | 0.273 | 0.421 | 0.423 | 0.094 | 0.117 | 0.091 | 0.127 | 0.186 |

TABLE 8

| Cation | 57 | 58 | 59 | 60 | 61 | 62 | 63 | 64 |
|---|---|---|---|---|---|---|---|---|
| | Embodiments 57-64 | | | | | | | |
| $B^{3+}$ | 49.6 | 50.5 | 54.8 | 45.3 | 47.1 | 41.2 | 51.5 | 55.3 |
| $Si^{4+}$ | 2.8 | 6.2 | 6.2 | 5.5 | 9.3 | 7.3 | 7.8 | 5.1 |
| $La^{3+}$ | 26.7 | 21.3 | 16.6 | 18.2 | 24.1 | 22.4 | 23.4 | 15.6 |
| $Y^{3+}$ | 13.5 | 6.3 | 10.5 | 7.6 | 8.3 | 7.6 | 9.3 | 11.4 |
| $Gd^{3+}$ | 0 | 0 | 0 | 0 | 0 | 1.5 | 0 | 0 |
| $Yb^{3+}$ | 0 | 1.1 | 0 | 0 | 0 | 0 | 0 | 0 |
| $Nb^{5+}$ | 1.8 | 5.2 | 7.1 | 8.3 | 4.2 | 6.8 | 2.7 | 3.5 |
| $Ti^{4+}$ | 0 | 1.2 | 0 | 1.4 | 0 | 0 | 0 | 0 |
| $Ta^{5+}$ | 0 | 0 | 0 | 2.5 | 0 | 0 | 0 | 0 |
| $W^{6+}$ | 0 | 0.4 | 0 | 0 | 0 | 0 | 0 | 0 |
| $Zr^{4+}$ | 1.5 | 6.3 | 3.5 | 8.5 | 5.3 | 9.4 | 4.5 | 7.6 |
| $Zn^{2+}$ | 4.1 | 1.5 | 1.3 | 2.7 | 1.7 | 2.2 | 0.8 | 1.5 |
| $Bi^{3+}$ | 0 | 0 | 0 | 0 | 0 | 0 | 0 | 0 |
| $\Sigma R^{+}$ | 0 | 0 | 0 | 0 | 0 | 1.6 | 0 | 0 |
| $\Sigma R^{2+}$ | 0 | 0 | 0 | 0 | 0 | 0 | 0 | 0 |
| Total | 100 | 100 | 100 | 100 | 100 | 100 | 100 | 100 |
| nd | 1.833 | 1.832 | 1.806 | 1.835 | 1.840 | 1.820 | 1.836 | 1.801 |
| vd | 42.6 | 43.5 | 47.1 | 42.5 | 41.6 | 42.5 | 43.0 | 48.2 |
| ($g/cm^3$) | 4.54 | 4.62 | 4.55 | 4.58 | 4.50 | 4.28 | 4.58 | 4.47 |
| $\lambda_{70}$ (nm) | | | | | | | | |
| $\lambda_{80}$ (nm) | 394 | 403 | 398 | 401 | 396 | 394 | 395 | 390 |
| Upper limit of devitrification temperature (° C.) | 1130 | 1135 | 1120 | 1140 | 1135 | 1120 | 1125 | 1115 |
| $B^{3+} + Si^{4+}$ | 52.4 | 56.7 | 61 | 50.8 | 56.4 | 48.5 | 59.3 | 60.4 |
| $\Sigma Ln^{3+}$ | 40.2 | 28.7 | 27.1 | 25.8 | 32.4 | 31.5 | 32.7 | 27 |
| $(B^{3+} + Si^{4+})/\Sigma Ln^{3+}$ | 1.304 | 1.976 | 2.251 | 1.969 | 1.741 | 1.54 | 1.814 | 2.237 |
| $\Sigma HR$ | 1.8 | 6.8 | 7.1 | 12.2 | 4.2 | 6.8 | 2.7 | 3.5 |
| $(Nb^{5+} + Ti^{4+})/\Sigma HR$ | 1 | 0.941 | 1 | 0.795 | 1 | 1 | 1 | 1 |
| $\Sigma HR/(B^{3+} + Si^{4+})$ | 0.034 | 0.12 | 0.116 | 0.240 | 0.075 | 0.140 | 0.046 | 0.058 |
| $\Sigma HR/\Sigma Ln^{3+}$ | 0.045 | 0.237 | 0.262 | 0.473 | 0.13 | 0.216 | 0.083 | 0.13 |

TABLE 9

| Cation | 65 | 66 | 67 | 68 | 69 | 70 | 71 | 72 |
|---|---|---|---|---|---|---|---|---|
| | Embodiment 65-72 | | | | | | | |
| $B^{3+}$ | 45 | 48.9 | 47.2 | 52.3 | 53.5 | 47.5 | 55.2 | 42.9 |
| $Si^{4+}$ | 5.2 | 3.2 | 2 | 7.2 | 6.8 | 8.2 | 4.5 | 14.2 |
| $La^{3+}$ | 20.7 | 24.5 | 27.4 | 21.4 | 22.1 | 23.4 | 19.5 | 18.8 |
| $Y^{3+}$ | 10.8 | 11.1 | 5.8 | 8.1 | 6.8 | 9.7 | 7.4 | 8 |
| $Gd^{3+}$ | 1.4 | 0 | 0 | 0 | 0 | 0 | 0 | 0 |
| $Yb^{3+}$ | 0 | 0 | 0 | 0 | 1.8 | 0 | 0 | 1.2 |
| $Nb^{5+}$ | 6.3 | 4.7 | 9.2 | 4.8 | 7.2 | 5.7 | 6.5 | 3.8 |
| $Ti^{4+}$ | 1.2 | 0 | 0 | 0 | 0 | 0 | 0 | 0.7 |
| $Ta^{5+}$ | 0 | 0 | 1.3 | 0 | 0 | 0 | 0 | 0 |
| $W^{6+}$ | 0.6 | 0 | 0 | 0 | 0 | 0 | 0 | 0.3 |
| $Zr^{4+}$ | 3.7 | 6.2 | 4.9 | 4.2 | 0 | 5.5 | 5.3 | 8.2 |
| $Zn^{2+}$ | 1.6 | 1.4 | 2.2 | 2 | 1.3 | 0 | 1.6 | 1.9 |
| $Bi^{3+}$ | 0 | 0 | 0 | 0 | 0.5 | 0 | 0 | 0 |
| $\Sigma R^{+}$ | 2.2 | 0 | 0 | 0 | 0 | 0 | 0 | 0 |
| $\Sigma R^{2+}$ | 1.3 | 0 | 0 | 0 | 0 | 0 | 0 | 0 |
| Total | 100 | 100 | 100 | 100 | 100 | 100 | 100 | 100 |
| nd | 1.835 | 1.840 | 1.822 | 1.816 | 1.825 | 1.837 | 1.792 | 1.820 |
| vd | 41.6 | 42.5 | 43.5 | 47.2 | 42.2 | 43.1 | 47.5 | 45.8 |
| ($g/cm^3$) | 4.29 | 4.38 | 4.41 | 4.51 | 4.56 | 4.60 | 4.55 | 4.47 |
| $\lambda_{70}$ (nm) | | | | | | | | |
| $\lambda_{80}$ (nm) | 400 | 398 | 396 | 395 | 397 | 396 | 398 | 399 |
| Upper limit of devitrification temperature (° C.) | 1120 | 1130 | 1120 | 1150 | 1110 | 1135 | 1130 | 1120 |
| $B^{3+} + Si^{4+}$ | 50.2 | 52.1 | 49.2 | 59.5 | 60.3 | 55.7 | 59.7 | 57.1 |
| $\Sigma Ln^{3+}$ | 32.9 | 35.6 | 33.2 | 29.5 | 30.7 | 33.1 | 26.9 | 28 |
| $(B^{3+} + Si^{4+})/\Sigma Ln^{3+}$ | 1.526 | 1.464 | 1.482 | 2.017 | 1.964 | 1.683 | 2.219 | 2.039 |
| $\Sigma HR$ | 8.1 | 4.7 | 10.5 | 4.8 | 7.2 | 5.7 | 6.5 | 4.8 |
| $(Nb^{5+} + Ti^{4+})/\Sigma HR$ | 0.926 | 1 | 0.876 | 1 | 1 | 1 | 1 | 0.938 |
| $\Sigma HR/(B^{3+} + Si^{4+})$ | 0.161 | 0.090 | 0.213 | 0.081 | 0.119 | 0.102 | 0.109 | 0.084 |
| $\Sigma HR/\Sigma Ln^{3+}$ | 0.246 | 0.132 | 0.316 | 0.163 | 0.235 | 0.172 | 0.242 | 0.171 |

In the above tables 1-9:

$\Sigma Ln^{3+}$ refers to the total amount of $La^{3+}$, $Y^{3+}$, $Gd^{3+}$ and $Yb^{3+}$;

$\Sigma HR$ refers to the total amount of $Nb^{5+}$, $Ti^{4+}$, $Ta^{5+}$ and $W^{+}$;

$\Sigma R^{+}$ refers to the total amount of $Li^{+}$, $Na^{+}$ and $K^{+}$;

$\Sigma R^{2+}$ refers to the total amount of $Mg^{2+}$, $Ca^{2+}$, $Sr^{2+}$ and $Ba^{2+}$.

The present invention relates to the optical glass, with high refractive index and low dispersion, which can be supplied stably, applicable to the glass preform and an optical element for shaping.

The invention claimed is:

1. An optical glass, represented by cation %, comprising:
30-less than 45% of $B^{3+}$;
the total amount of $Si^{4+}$ and $B^{3+}$ being 40-55%;
5-13% of $Si^{4+}$;
20-35% of $La^{3+}$;
0-15% of $Y^{3+}$;
1-8% of $Gd^{3+}$;
0-5% of $Yb^{3+}$;
the total amount of $La^{3+}$, $Y^{3+}$, $Gd^{3+}$ and $Yb^{3+}$ being 30-50%;
$(Si^{4+}+B^{3+})/(La^{3+}+Y^{3+}+Gd^{3+}+Yb^{3+})$ is greater than 1 but less than 1.8;
0.5-10% of $Nb^{5+}$;
3-8% of $Ti^{4+}$;
0-10% of $Ta^{5+}$;
0-5% of $W^{6+}$;
the total amount of $Nb^{5+}$, $Ti^{4+}$, $Ta^{5+}$ and $W^{6+}$ being 3.5-15%;
$(Nb^{5+}+Ti^{4+})/(Nb^{5+}+Ti^{4+}+Ta^{5+}+W^{6+})$ being 0.7-1;
$(Nb^{5+}+Ti^{4+}+Ta^{5+}+W^{6+})/(Si^{4+}+B^{3+})$ being 0.06-0.35;
$(Nb^{5+}+Ti^{4+}+Ta^{5+}+W^{6+})/(La^{3+}+Y^{3+}+Gd^{3+}+Yb^{3+})$ being 0.07-0.4;
0-10% of $Zr^{4+}$;
0-10% of $Zn^{2+}$;
0-10% of $Bi^{3+}$.

2. The optical glass according to claim 1, also optionally comprising:
$Li^{+}$, $Na^{+}$ and $K^{+}$ in a total amount of less than 10%;
and $Ba^{2+}$, $Mg^{2+}$, $Ca^{2+}$ and $Sr^{2+}$ in a total amount of less than 10%.

3. The optical glass according to claim 2, wherein:
the total amount of $Li^{+}$, $Na^{+}$ and $K^{+}$ being less than 5%;
and the total amount of $Ba^{2+}$, $Mg^{2+}$, $Ca^{2+}$ and $Sr^{2+}$ being less than 5%.

4. The optical glass according to claim 1, wherein 2.5-8% of $Gd^{3+}$; and 3-7% of $Ti^{4+}$.

5. The optical glass according to claim 1, wherein the composition is free of $Ta^{5+}$.

6. The optical glass according to claim 1, wherein the refractive index nd of glass is 1.85-1.95, the Abbe number νd is 32-40, and the corresponding wavelength is below 420 nm when the transmittance of glass reaches 70%, the glass density is below 5 g/cm$^3$, and the upper limit of devitrification temperature of glass is below 1250° C.

7. A glass preform, which is made of the optical glass according to claim 1.

8. An optical element, which is made of the optical glass according to claim 1.

9. An optical glass, represented by cation %, comprising:
5-13% of $Si^{4+}$;
45-55% of $B^{3+}$;
the total amount of $Si^{4+}$ and $B^{3+}$ being 50-65%;
15-35% of $La^{3+}$;
0-10% of $Y^{3+}$;
0-8% of $Gd^{3+}$,
0-5% of $Yb^{3+}$;
the total amount of $La^{3+}$, $Y^{3+}$, $Gd^{3+}$ and $Yb^{3+}$ being 25-45%;
$(Si^{4+}+B^{3+})/(La^{3+}+Y^{3+}+Gd^{3+}+Yb^{3+})$ is 1.7-2.3;
0.5-20% of $Nb^{5+}$;
0-5% of $Ti^{4+}$;
0-7% of $Ta^{5+}$;
0-5% of $W^{6+}$;
the total amount of $Nb^{5+}$, $Ti^{4+}$, $Ta^{5+}$ and $W^{6+}$ being 0.5-20%;
$(Nb^{5+}+Ti^{4+})/(Nb^{5+}+Ti^{4+}+Ta^{5+}+W^{6+})$ being 0.7-1;
$(Nb^{5+}+Ti^{4+}+Ta^{5+}+W^{6+})/(Si^{4+}+B^{3+})$ being 0.01-0.35;
$(Nb^{5+}+Ti^{4+}+Ta^{5+}+W^{6+})/(La^{3+}+Y^{3+}+Gd^{3+}+Yb^{3+})$ being 0.04-0.4;
0-10% of $Zr^{4+}$;
0.5-5% of $Zn^{2+}$;
0-6% of $Bi^{3+}$.

10. The optical glass according to claim 9, also optionally comprising:
$Li^{+}$, $Na^{+}$ and $K^{+}$ in a total amount of less than 10%;
and $Ba^{2+}$, $Mg^{2+}$, $Ca^{2+}$ and $Sr^{2+}$ in a total amount of less than 10%.

11. The optical glass according to claim 10, wherein:
the total amount of $Li^{+}$, $Na^{+}$ and $K^{+}$ being less than 5%;
and the total amount of $Ba^{2+}$, $Mg^{2+}$, $Ca^{2+}$ and $Sr^{2+}$ being less than 5%.

12. The optical glass according to claim 9, wherein: 1.1-3% of $Zn^{2+}$; 0-less than 2.5% of $Gd^{3+}$; 0-less than 3% of $Ti^{4+}$.

13. The optical glass according to claim 9, wherein the composition is free of $Ta^{5+}$.

14. The optical glass according to claim 9, wherein the refractive index nd is 1.78-1.85, the Abbe number νd is 40-50, the corresponding wavelength is below 420 nm when the transmittance of glass reaches 80%, the density is below 5 g/cm$^3$, and the upper limit of devitrification temperature is below 1250° C.

15. A glass preform, which is made of the optical glass according to claim 9.

16. An optical element, which is made of the optical glass according to claim 9.

* * * * *